(12) United States Patent
Hanson

(10) Patent No.: US 6,895,710 B2
(45) Date of Patent: May 24, 2005

(54) CLAMPING FISHING LURE

(76) Inventor: Terry Patrick Hanson, 1237 W. Roscoe St., Chicago, IL (US) 60657

( * ) Notice: Subject to any disclaimer, the term of this patent is extended or adjusted under 35 U.S.C. 154(b) by 0 days.

(21) Appl. No.: 10/641,270

(22) Filed: Aug. 14, 2003

(65) Prior Publication Data

US 2005/0039375 A1    Feb. 24, 2005

(51) Int. Cl.[7] .................. A01K 85/00; A01K 83/06
(52) U.S. Cl. ................... 43/42.45; 43/4.5; 43/44.6
(58) Field of Search .................. 43/42.45, 44.6, 43/42.09, 44.83

(56) References Cited

U.S. PATENT DOCUMENTS

| | | | | |
|---|---|---|---|---|
| 2,659,996 A | * | 11/1953 | Hegler, Jr. .................. | 43/44.6 |
| 2,754,613 A | * | 7/1956 | Rogers et al. ............. | 43/42.38 |
| 2,780,885 A | * | 2/1957 | Callahan .................... | 43/44.6 |
| 2,940,208 A | * | 6/1960 | Oswald ....................... | 43/44.6 |
| 4,910,907 A | * | 3/1990 | Schlaegel ................... | 43/44.6 |
| D331,788 S | * | 12/1992 | Jensen ....................... | D22/126 |
| 5,761,843 A | * | 6/1998 | Lynch et al. .................. | 43/4.5 |

\* cited by examiner

*Primary Examiner*—Teri Pham Luu
*Assistant Examiner*—Bret Hayes
(74) *Attorney, Agent, or Firm*—Taft, Stettinius & Hollister LLP

(57) ABSTRACT

A fishing lure that can be readily attached to clothing, fishing rods, and other objects is disclosed. The fishing lure has an alligator-style clamp that has an eyelet at one end of the clamp for receiving the fishing line and is additionally connected to a fishing hook. Skirts or dressings adaptive to fishing can be secured to the body of the fishing lure in order for the lure to attract different or additional fish. These dressings for the fishing lure are found in a variety of colors, forms, and designs. A preferred embodiment of the present invention includes the body of the fishing lure being shaped to resemble an animal.

4 Claims, 24 Drawing Sheets

CLAMPING FISHING LURE

BACKGROUND

1. Field of the Invention

The present invention is directed to a fishing lure that can be clamped onto objects of interest; particularly, a fishing lure that can be secured to the fishing rod or other fishing items both while attached and detached from the fishing line.

2. Background of the Invention

Fishermen have long sought a way to protect the fishing lure and themselves during the storage and the transport of the lure tied to the fishing line from one fishing site to another. A fishing lure swinging freely may become entangled in an undesirable foreign object or, even worse, the fisherman. The lure poses a danger both to the fisherman and to others in proximity to the lure.

Traditionally, fishermen will hook the lure onto an eyelet of the fishing rod and then tighten the line to safely secure the lure to the rod. Alternatively, problems with conveniently storing and transporting fishing lures have been combated by attaching a lure holder to the fisherman's belt or attaching some type of fishing lure retention device to the fishing rod.

A problem with the traditional method of hooking the lure to the eyelet of the fishing rod and then tightening the line is that this method will commonly damage the eyelet of the fishing rod.

The more recent approach of attaching a lure holder to the fisherman's belt also has disadvantages: it adds another piece of equipment to the expedition; it requires the lure to be detached from the fishing line; and it may be inconvenient when fishing while wading in the water.

Other fishermen have attached the fishing lure to the fishing poles using a retention device located on the fishing pole itself. Recent attempts of such devices include U.S. Pat. No. 5,235,775 to Daughtry and U.S. Pat. No. 5,448,851 to Nyberg. Daughtry discloses a fishing lure holder that locks to the fishing rod. Nyberg discloses a device that retains the fishing lure by locking it between the end of a screw and the upper wall of a tubular member connected to the fishing rod. However, in both cases, the retention devices add extra weight to the rod and cause the rod to be bulky. In addition, neither invention allows the fishing lures to be secured to objects other than a fishing rod.

Prior art measures to overcome some of the problems have never incorporated such safety and convenience measures into the fishing lures themselves, nor has any patent incorporated a clamp or clip into the fishing lure design. The present invention is a novel approach to the problems associated with the storage of lures and the transportation of lures to and from the fishing site.

SUMMARY

The invention is directed to a fishing lure that incorporates a clamp or clip for securing the lure to certain objects of interest. More specifically, the fishing lure clamps to instruments used in the sport of fishing such as a fishing rod or tackle box. In accordance with the first aspect of the present invention, a lure is provided that includes a clamp integrated or incorporated therewith that is adapted to clamp the lure to the fishing rod and/or some other object (such as a fishing hat). A means for attaching a fishing line to the lure body is provided and a fishing hook is connected to the lure body.

In a more detailed embodiment of the invention, the clamp has a pair of opposed jaws. The opposed jaws are normally biased to the closed position. In another more detailed embodiment, the fishing line is connected to the lure body by a hole, generally referred to as a line eyelet, located at a point on the lure body which allows the lure body to receive the fishing line. In a further detailed embodiment, the line eyelet is located on the proximal end (i.e., the end that is approximate to end of the lure that is tied to the fishing line) of one of the jaws of the clamp. In another further detailed embodiment, a ringlet is threaded through the line eyelet for receiving the fishing line. In another detailed embodiment, a hook eyelet is located on the distal end of one of the jaws of the clamp to facilitate the connection of the fish hook to the lure body. In yet another detailed embodiment, a hook ringlet is threaded through the hook eyelet to further facilitate the connection of the hook to the lure body.

In a further detailed embodiment, a dressing adaptive to fishing (such as a skirt or buck-tail, for example) is secured on or about the lure body of the fishing lure. In a further more detailed embodiment, the lure body forms the shape of artificial bait for attracting various species of fish. Another detailed embodiment provides that the lure body forms the shape of artificial spoon bait. Yet another detailed embodiment provides that the lure body forms the shape of artificial tube bait. Still another detailed embodiment provides that the lure body forms the shape of artificial jig bait. In another detailed embodiment, the lure body forms the shape of artificial animal bait. In a further detailed embodiment, the clamp of the lure body forms the mouth of the artificial animal bait such that when the clamp is compressed to spread open the mouth of the artificial animal bait, objects may be inserted between the jaws of the clamp. In a more detailed embodiment, the lure body is composed of a pliable material. In another more detailed embodiment, the lure body is composed of a hard, inflexible material. In still a further more detailed embodiment, the fishing lure includes a spinner blade connected to the lure body that facilitates the rotation of the lure body when pulled through water.

A second aspect of the present invention provides a clamp with a first jaw and an opposing second jaw that are pivotally secured to one another. The first jaw and the second jaw are biased to a closed position. When the opposing jaws are compressed to the open position, items may be inserted between the jaws. The clamp forms part of a lure body or is integrated within or is attached to the lure body. The second aspect also includes a means for attaching a fishing line to the lure body and a fishing hook that is connected to the lure body.

In a more detailed embodiment of the second aspect of the present invention, at least a portion of the clamp is mounted to or integrated with a body of an artificial bait. In a further detailed embodiment, an attractant is coupled to the clamp. The attractant is taken from a group consisting of a skirt, a buck-tail, an artificial bait, a spinner assembly, and a rattle.

DETAILED DESCRIPTION

Figure 1:
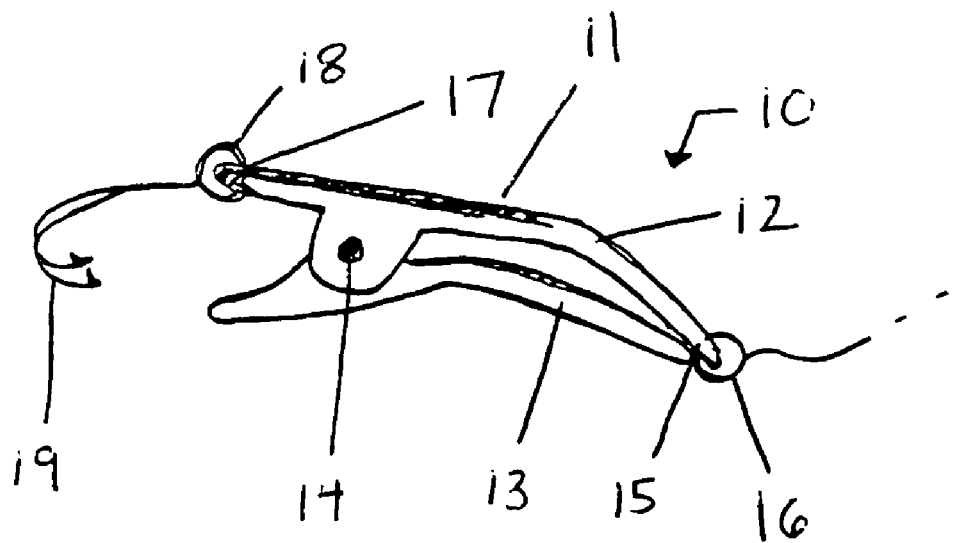
FIG. 1 is a partial perspective view of an exemplary embodiment of the applicant's fishing lure illustrating the lure body in the closed position.

An exemplary embodiment of the fishing lure 10 is illustrated in FIG. 1. The lure body includes a clamp 11 having an upper jaw 12 and lower jaw 13 coupled at a hinge 14. The upper jaw 12 and lower jaw 13 are biased by a spring (not shown) at the hinge 14 to the closed position.

A line eyelet 15 is located on the proximal end of the upper jaw 12 of the clamp 11 and a line ringlet 16 is threaded through the line eyelet 15. The line ringlet 16 receives the fishing line from the rod. A hook eyelet 17 is located on the distal end of the upper jaw 12 and a hook ringlet 18 is threaded through the hook eyelet 17. The hook ringlet 18 is connected to the hook 19.

Figure 2:
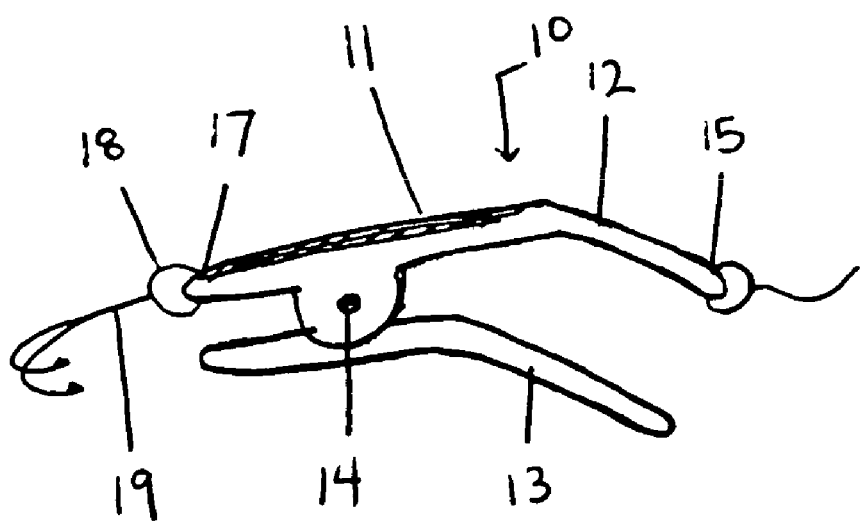
FIG. 2 is a partial perspective view of the fishing lure of FIG. 1 illustrating the lure body in an open position.

In this exemplary embodiment, to open the clamp formed by the upper jaw and lower jaws, force is exerted on the distal ends of the upper jaw 12 and lower jaw 13 such that the distal ends of the upper jaw 12 and lower jaw 13 are clamped closer together as shown in FIG. 2. This compressing force on the distal ends results in the proximal ends of the upper jaw 12 and lower jaw 13 being spread apart from one another. An opening is formed between the proximal ends of the upper jaw 12 and lower jaw 13 allowing the taper of a fishing rod (or any other object) to be received by the jaws of the clamp 11. When the distal ends of the upper jaw 12 and lower jaw 13 are released, the proximal ends of the upper jaw 12 and lower jaw 13 clamp onto the taper of the fishing rod (or other object) inserted in the opening, thereby securing the fishing lure 10 to the fishing rod.

Securing the fishing lure 10 to the taper of the fishing rod provides the advantage that the hook 19 of the fishing lure 10 is not swinging freely. In addition, since the present invention eliminates the need to hook the lure to an eyelet of the fishing rod in order to secure the lure to the fishing rod, the eyelets of the fishing rod are not damaged by the force the hook 19 exerts on them when the hook is secured to one of the fishing rod's eyelets and reeled taut. Damage to the pole is decreased and safety is increased by clamping the fishing lure 10 to the taper of the fishing rod during transportation.

As noted, the fishing lure 10 can also be secured to other objects, not simply the fishing rod. Following the same method for opening and closing the jaws of the clamp 11, the fishing lure 10 of the present invention can be clamped to jackets, fishing vests, hats, belts, and tackle boxes, among others. Securing the fishing lure 10 to such objects allows it to be transported conveniently and efficiently while leaving the hands free. Another added advantage, particularly when wading into the water, is that the lures can be secured safely to the clothing of the fisherman eliminating the need for a box full of lures clipped to the belt or hooks placed in the hat.

The fishing lure 10 can be unsecured from the fishing rod (and other objects) by again exerting force on the distal ends of the upper jaw 12 and lower jaw 13 of the clamp 11 such that the distal ends of the upper jaw 12 and lower jaw 13 are compressed closer together. The proximal ends of the upper jaw 12 and lower jaw 13 will be spread wider apart and allow for the fishing lure 10 to be unsecured from the fishing rod (and other objects).

Figure 3:
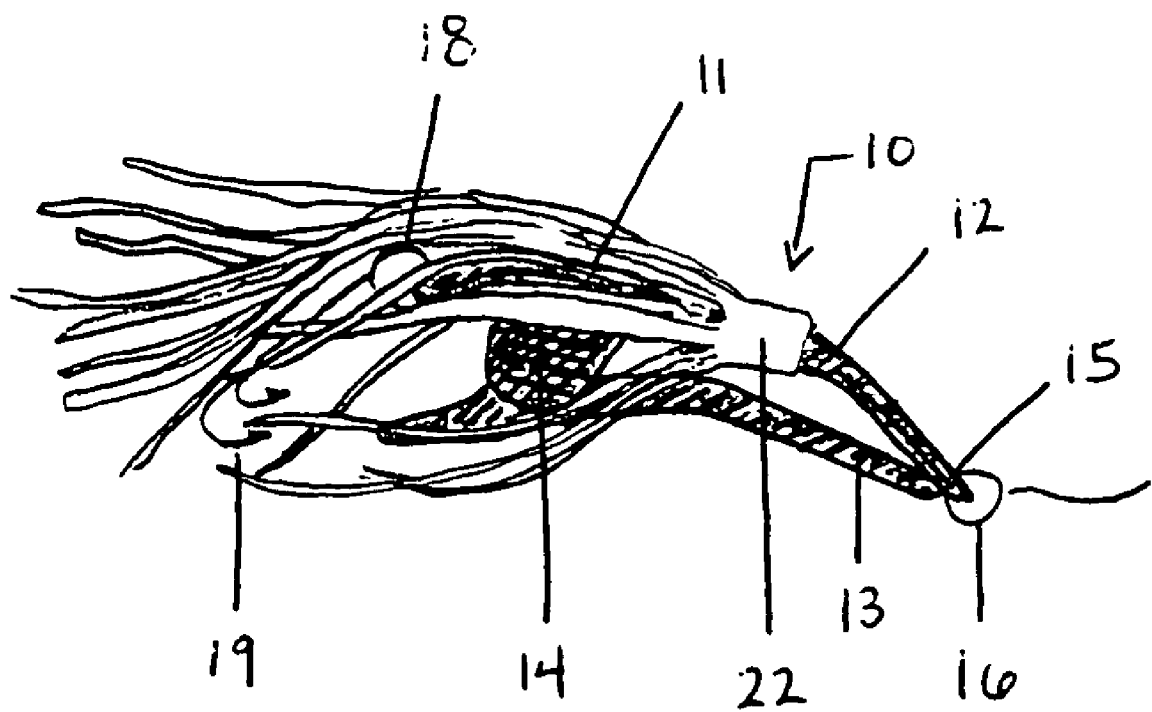
FIG. 3 is a partial perspective view of the exemplary embodiment of FIG. 1 illustrating the lure body in the closed position with a dressing adaptive to fishing (a skirt, in this example) secured about the upper jaw of the clamp of the lure body.
Figure 4:
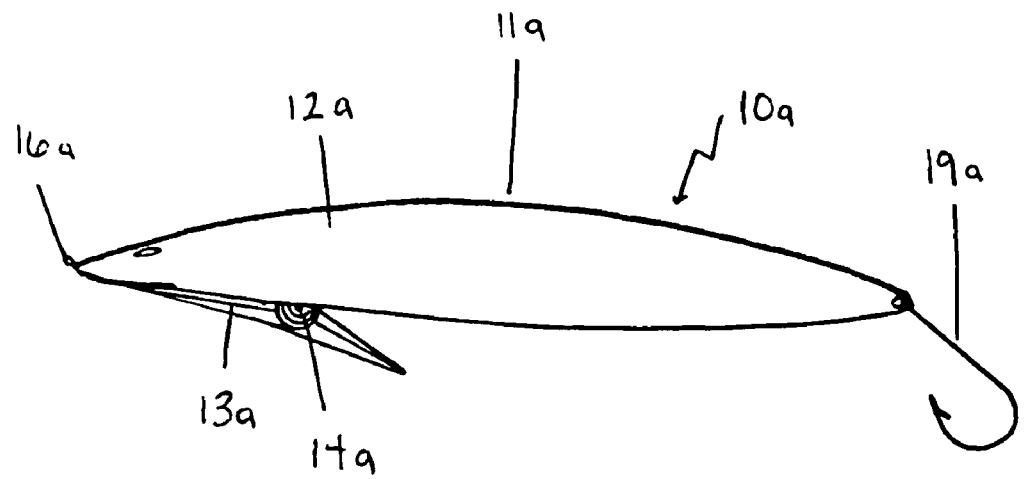
FIG. 4 is a side view of an alternate embodiment of the applicant's fishing lure illustrating the lure body shaped as a fishing spoon with the clamp in the closed position.

An alternate embodiment is illustrated in FIG. 3 wherein a dressing such as a skirt 22 adaptive to fishing has been secured about the upper jaw 12 of the clamp 11. The skirt 22 provides additional attractiveness for the fish and is a typical dressing used on fishing lures. Alternative dressings or attractants such as buck-tails, artificial baits, spinner assemblies, and rattles may be utilized.

Figure 5:
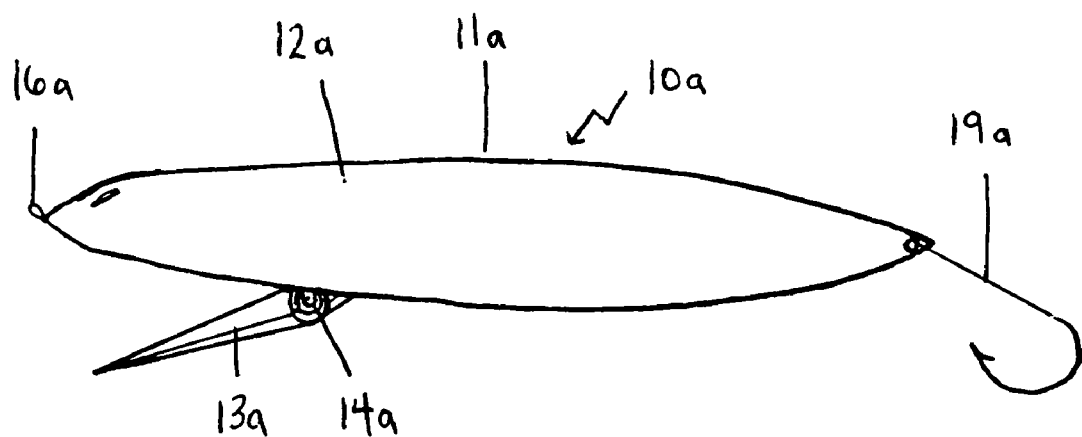
FIG. 5 is a side view of the fishing lure of FIG. 4 illustrating the clamp in an open position.
Figure 6:
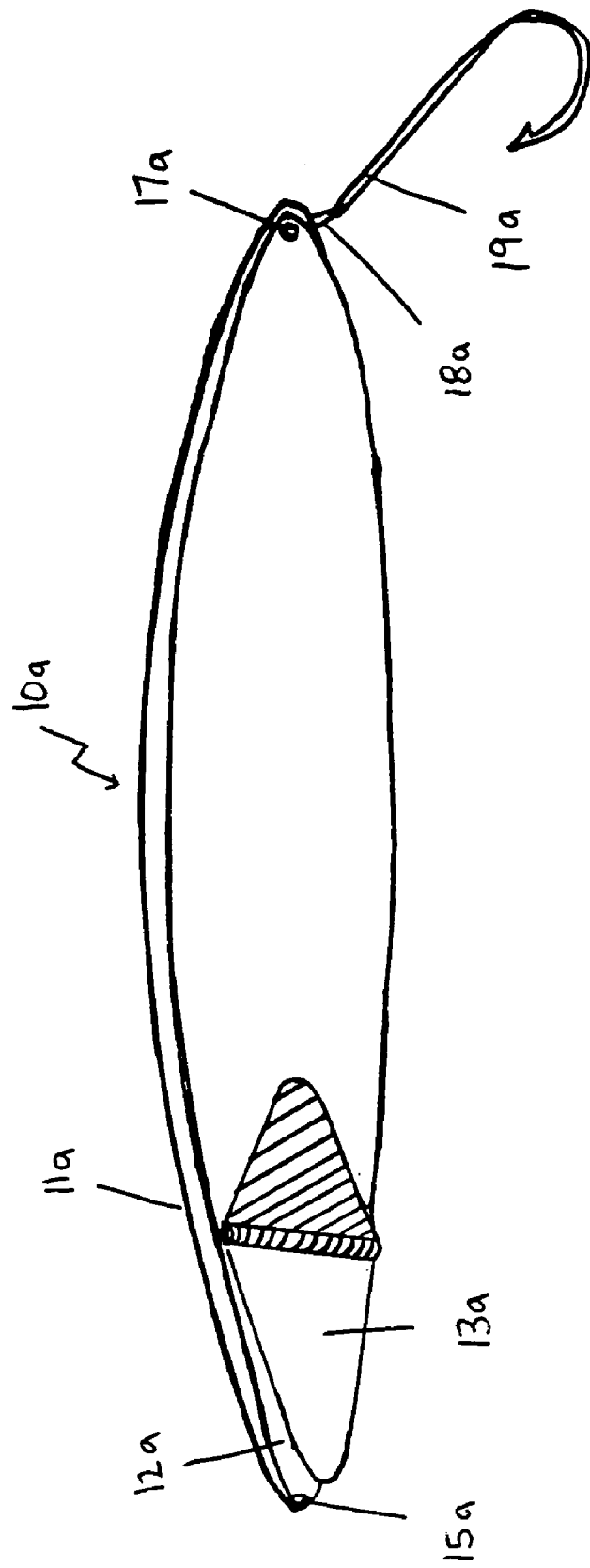
FIG. 6 is a partial bottom view of the fishing lure of FIG. 4.
Figure 7:
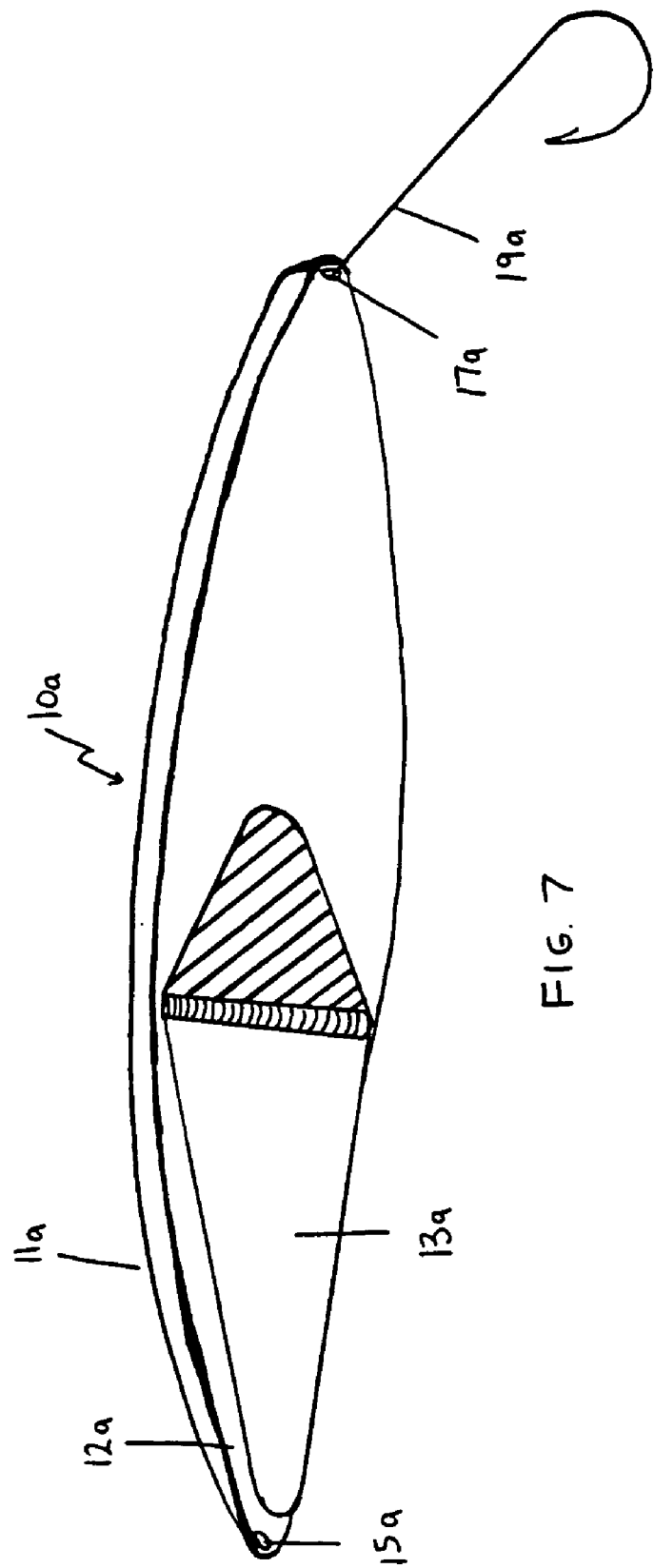
FIG. 7 is a partial bottom view of a fishing spoon similar to the embodiment of FIG. 4 having a larger proximal portion of the lower jaw.

A second alternate embodiment is illustrated in FIGS. 4–7 wherein the upper jaw 12a is made of a hard, inflexible material that is shaped as a fishing spoon. The upper jaw 12a and lower jaw 13a are biased closed by a spring (not shown) at the hinge 14a. As shown in FIG. 5, when the upper jaw 12a and lower jaw 13a are compressed together distally beyond the hinge 14a, the proximal ends of the upper jaw 12a and lower jaw 13a are spread open in the shape of a mouth which allows the taper of a fishing rod (or other object) to be received between the proximal ends of the upper jaw 12a and lower jaw 13a. Releasing the upper jaw 12a and lower jaw 13a will cause the fishing lure 10a to clamp onto the fishing pole (or other object) placed between the upper jaw 12a and lower jaw 13a.

Figure 8:
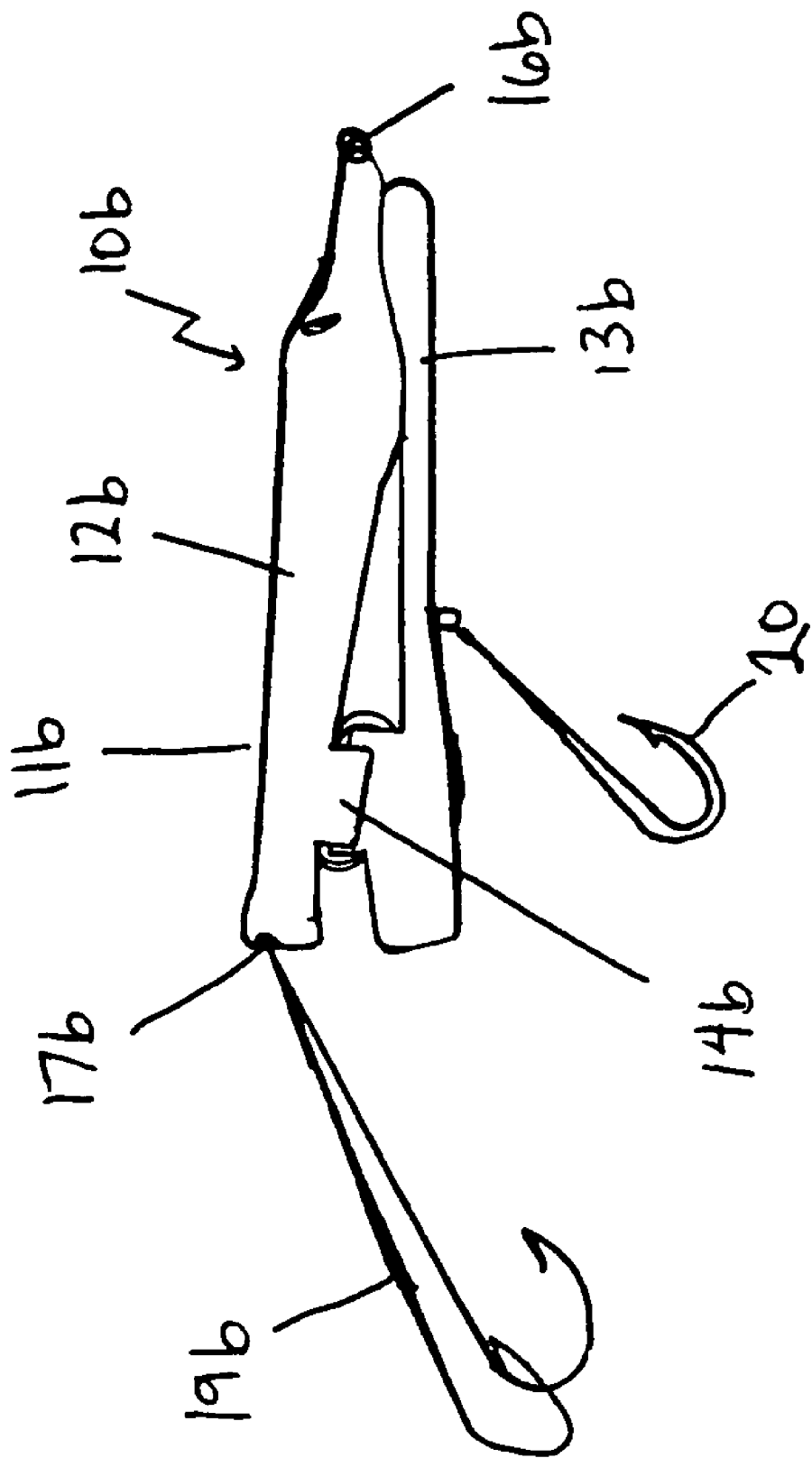
FIG. 8 is a side view of an alternate embodiment of the applicant's fishing lure illustrating a lure body that resembles a dog.

A third alternate embodiment is illustrated in FIG. 8 wherein the clamp 11b resembles a dog. The upper jaw 12b is connected with a hook 19b at the distal end. A lower hook 20 is connected to the lower jaw 13b.

Figure 9:
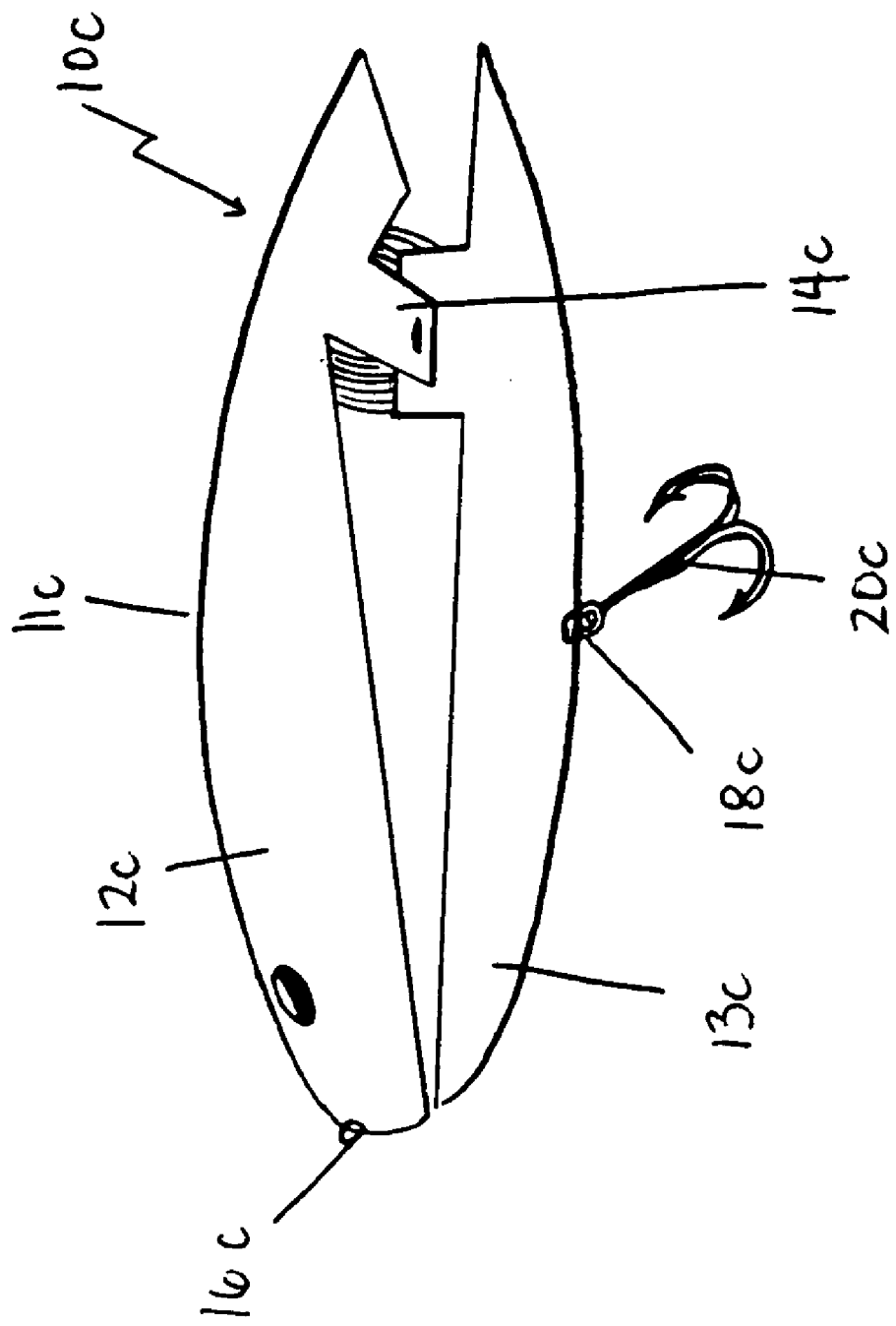
FIG. 9 is a side view of an alternate embodiment of the applicant's fishing lure illustrating the lure body shaped as a shuttle-bug.

A fourth alternate embodiment is illustrated in FIG. 9 wherein the clamp 11c is shaped as a shuttle-bug. The upper jaw 12c and lower jaw 13c are connected at the hinge 14c to form the mouth of the shuttle-bug clamper. The clamp 11c is made of a substantially rigid outer shell material (such as plastic) and is decorated (with eyes and colors) as desired. A lower hook 20c is connected to the bottom of the lower jaw 13c by a hook ringlet 18.

Figure 10:
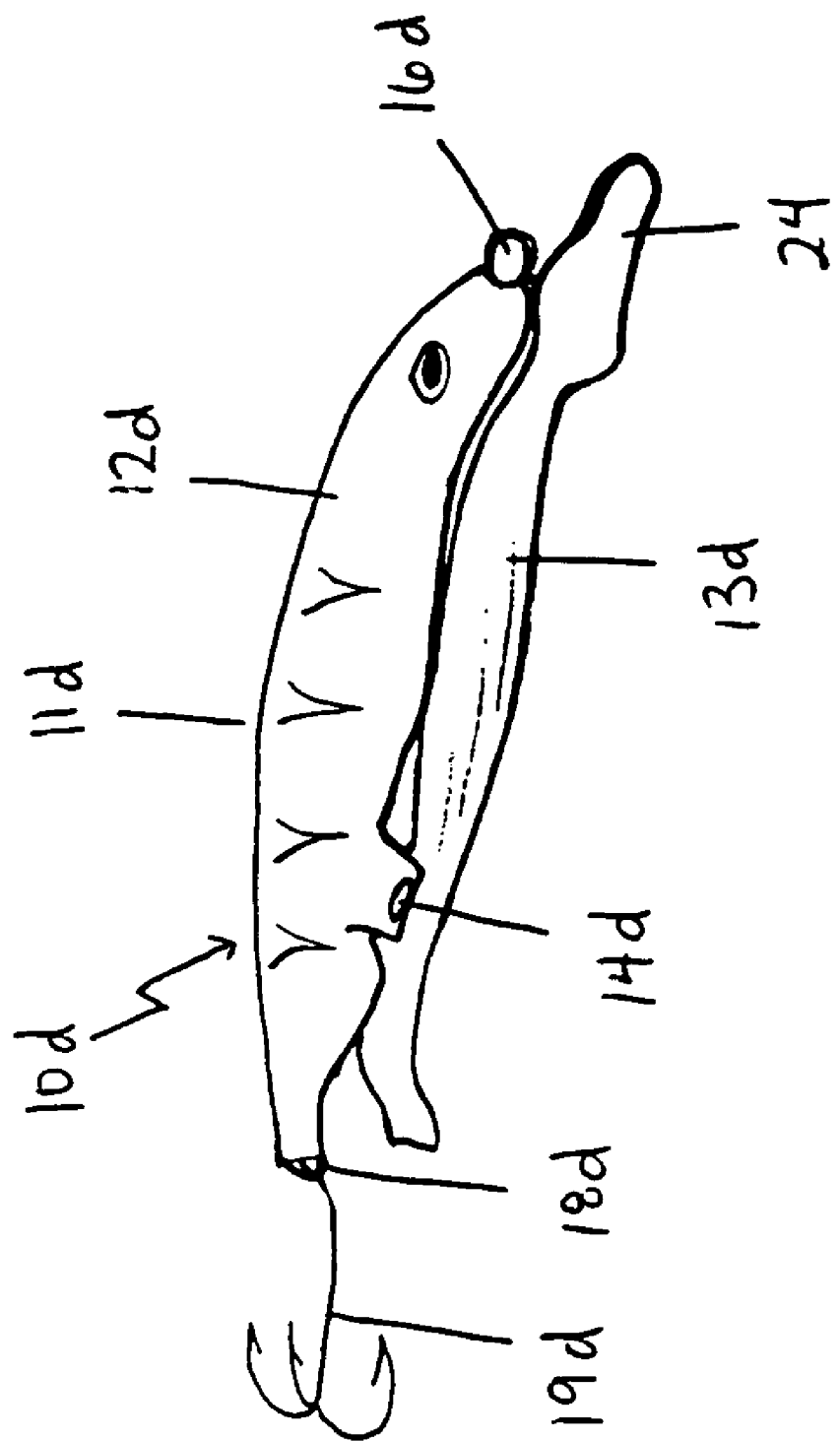
FIG. 10 is a side view of an alternate embodiment of the applicant's fishing lure illustrating a hard lure body with an extended diving lip.

A fifth alternate embodiment is illustrated in FIG. 10 wherein the proximal end includes an extended diving or swimming lip 24 of the lower jaw 13d.

Figure 11:
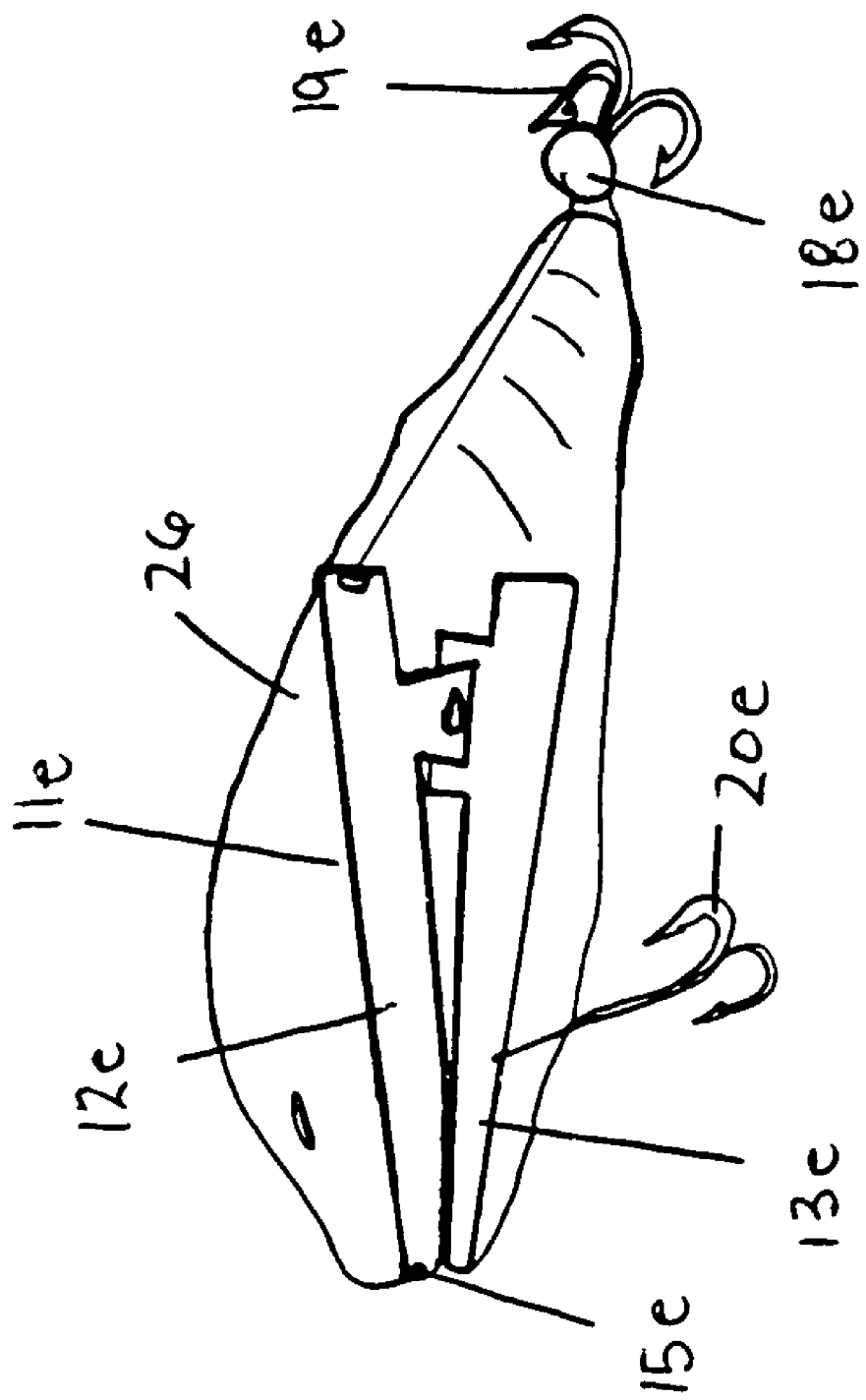
FIG. 11 is a side view of an alternate embodiment of the applicant's fishing lure illustrating a lure body that comprises a clamp encased in a flexible, gel shell.

A sixth alternate embodiment, illustrated in FIG. 11, depicts a clamping soft-body bait that includes the clamp 11e encased or molded within a flexible, gel or rubber-like shell 26. The pliable shell 26 allows for the upper jaw 12e, lower jaw 13e, and hinge 14e located therewithin to be manipulated by a user. Squeezing the upper jaw 12e and lower jaw 13e at their respective distal ends will spread apart the proximal ends of the upper jaw 12e and lower jaw 13e to resemble an open mouth of the soft-body bait.

Figure 12:
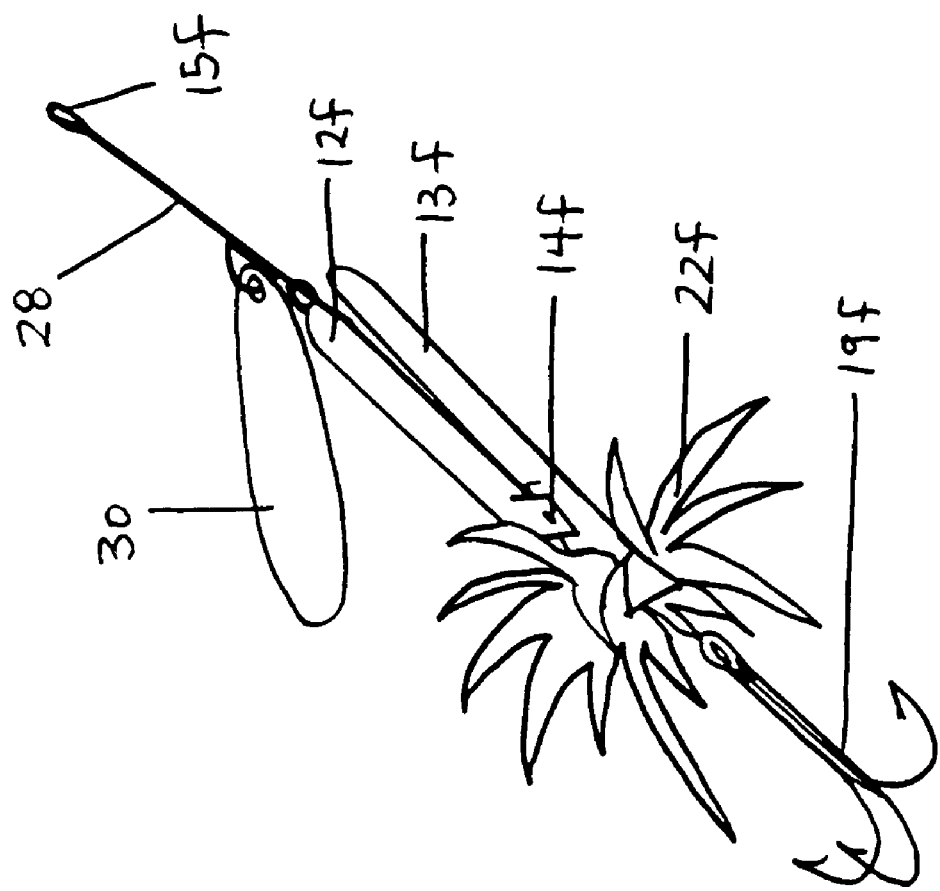
FIG. 12 is a partial perspective view of an alternate embodiment of the applicant's fishing lure illustrating a spinner lure having a dressing secured about a clamp and a spinner blade connected at a point along the leader wire attached to the proximal end of the clamp.

A seventh alternate embodiment, illustrated in FIG. 12, depicts a clamping spinner bait that includes a dressing 22f secured to the distal end of clamp 11f. In addition, a leader wire 28 with a line eyelet 15f extends from the proximal end of the upper jaw 12f. A spinner blade 30 which facilitates rotation is connected at a point along the leader wire 28.

Figure 13:
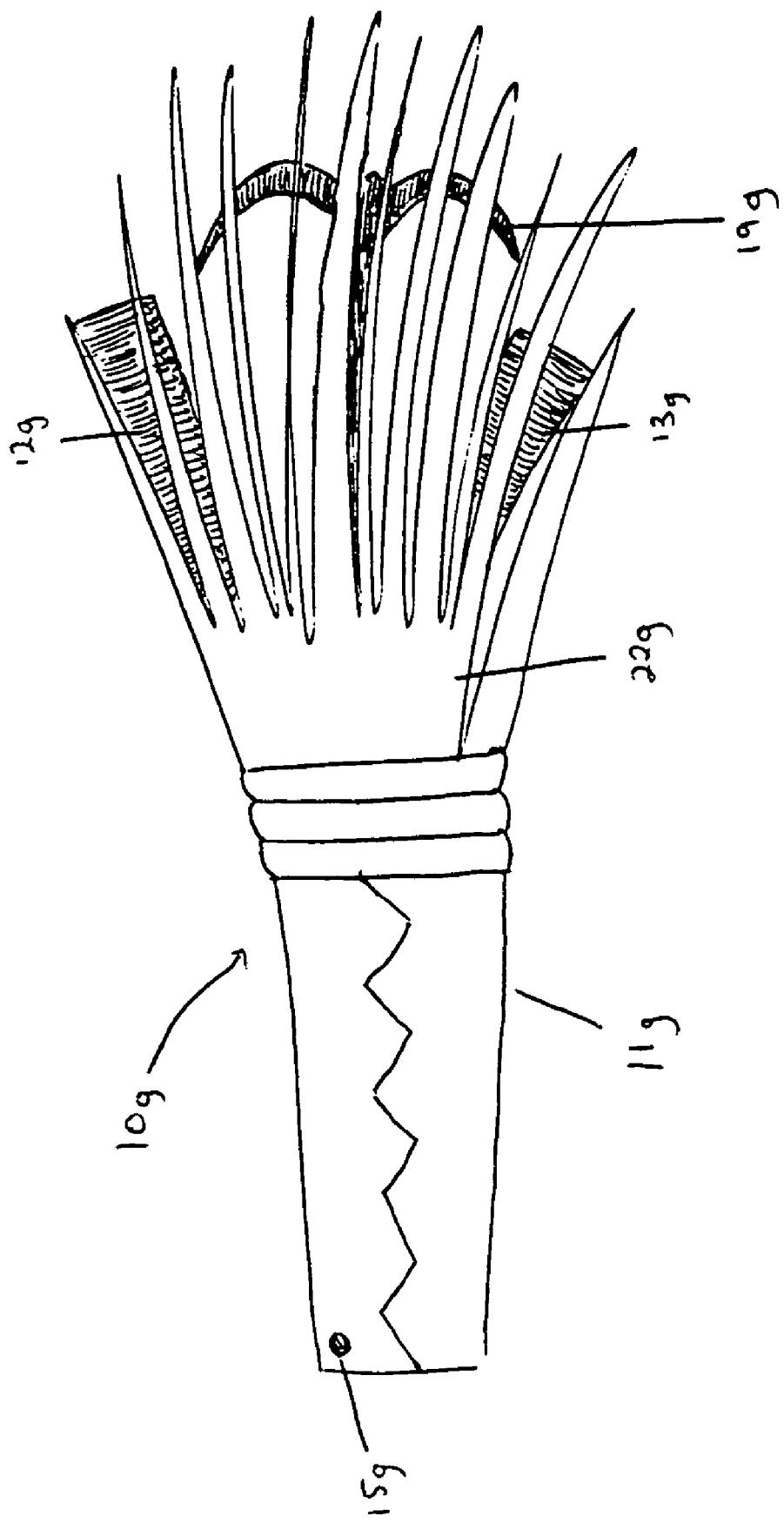
FIG. 13 is a side view of an alternate embodiment of the applicant's fishing lure illustrating a fishing jig with a clamp at the proximal end.

An eighth alternate embodiment, illustrated in FIG. 13, depicts a clamping jig head bait that includes a dressing 22g secured to the clamp 11g. The dressing 22g partially hides the upper jaw 12g and lower jaw 13g as well as the hook 19g.

Figure 14:
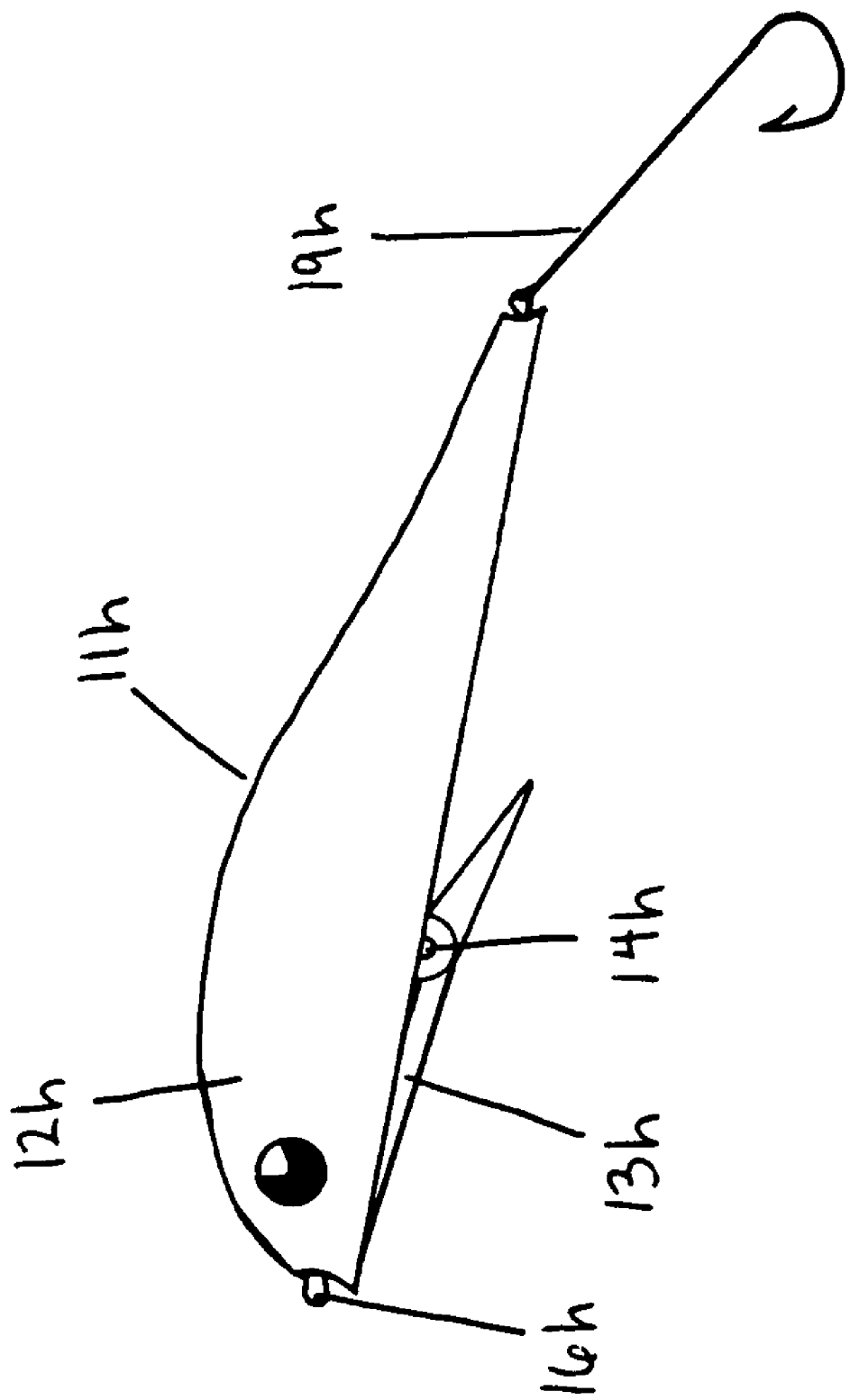
FIG. 14 is a side view of an alternate embodiment of the applicant's fishing lure illustrating a hard body guppy with the clamp in the closed position.
Figure 15:
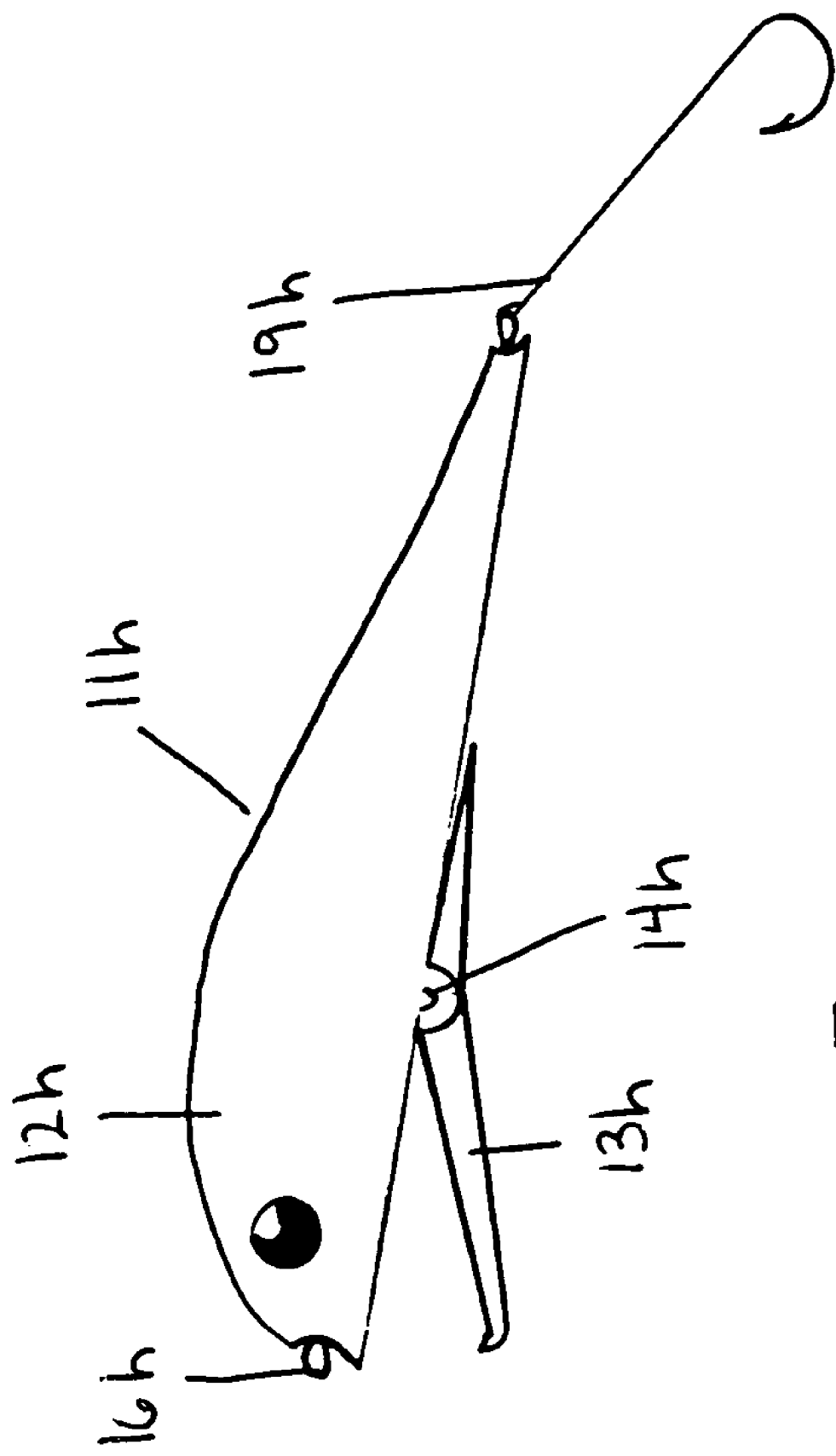
FIG. 15 is a side view of the fishing lure of FIG. 15 with the clamp in the open position.

A ninth alternate embodiment is illustrated in FIGS. 14 and 15 wherein the clamp 11h is shaped as a hard body guppy. The upper jaw 12h and lower jaw 13h are connected at the hinge 14h to form the mouth of the hard body guppy. The upper jaw 12h of the clamp 11h has an outer shell of rigid material and is decorated (with eyes and colors) as desired. The fishing line is received at the line eyelet 15h located at the proximal end of the clamp 11h.

Figure 16:
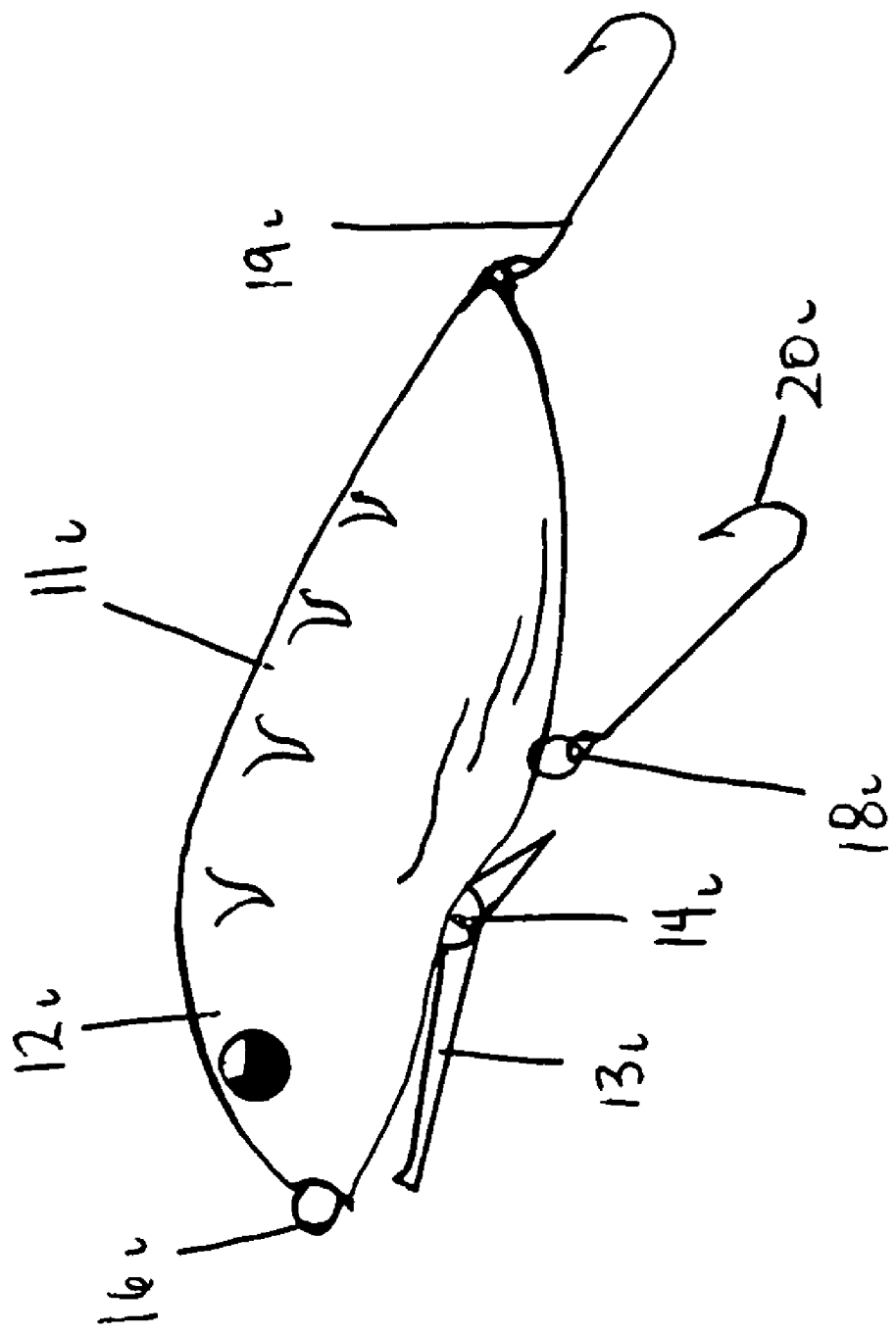
FIG. 16 is a side view of an alternate embodiment of the applicant's fishing lure illustrating a chubby guppy with the clamp in a partially open position.

A tenth alternate embodiment is illustrated in FIG. 16 wherein the clamp 11i is shaped as a chubby guppy. The upper jaw 12i and lower jaw 13i are connected at the hinge 14i to form the mouth of the chubby guppy. The upper jaw 12i of the clamp 11i is made of a resilient material and is decorated (with eyes and colors) as desired. A lower hook 20i is connected to the bottom of the upper jaw 12i, distal from the lower jaw 13i, by a hook ringlet 18i.

Figure 17:
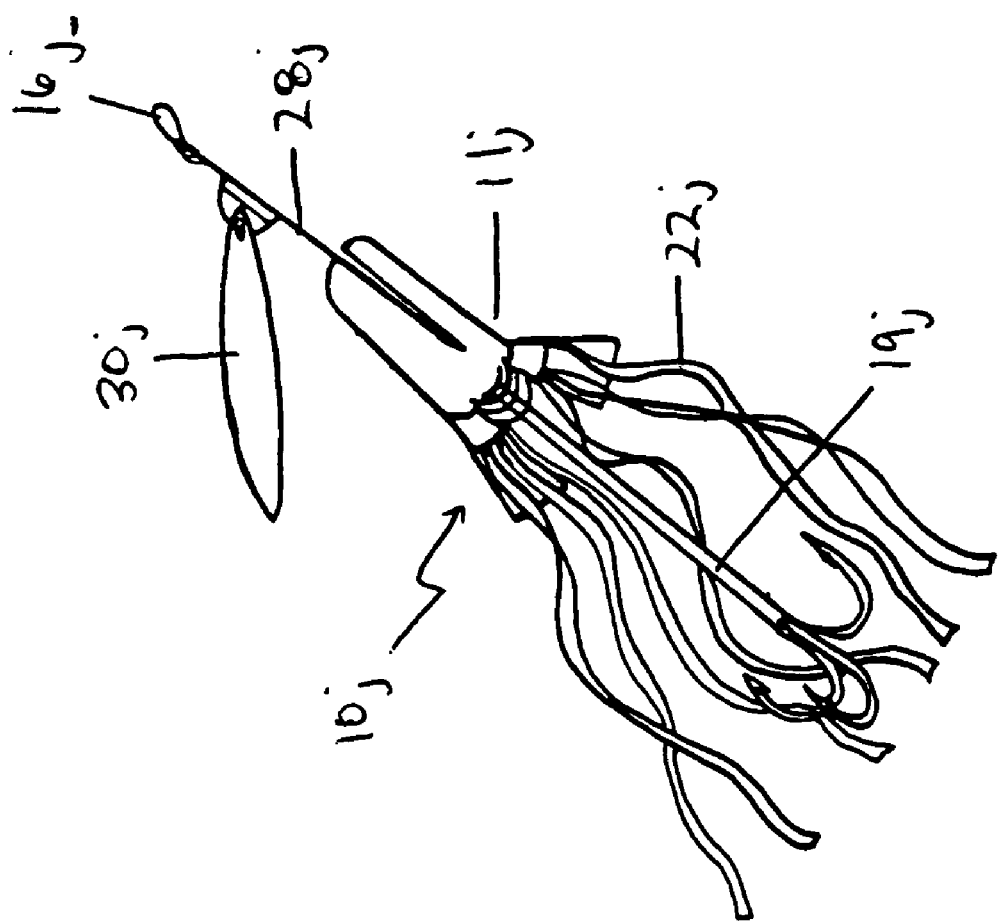
FIG. 17 is a partial perspective view of an alternate embodiment of the applicant's fishing lure illustrating a spinner lure having a dressing secured to the distal portion of the upper and lower jaws of the clamp, and the clamp is in the closed position.
Figure 18:
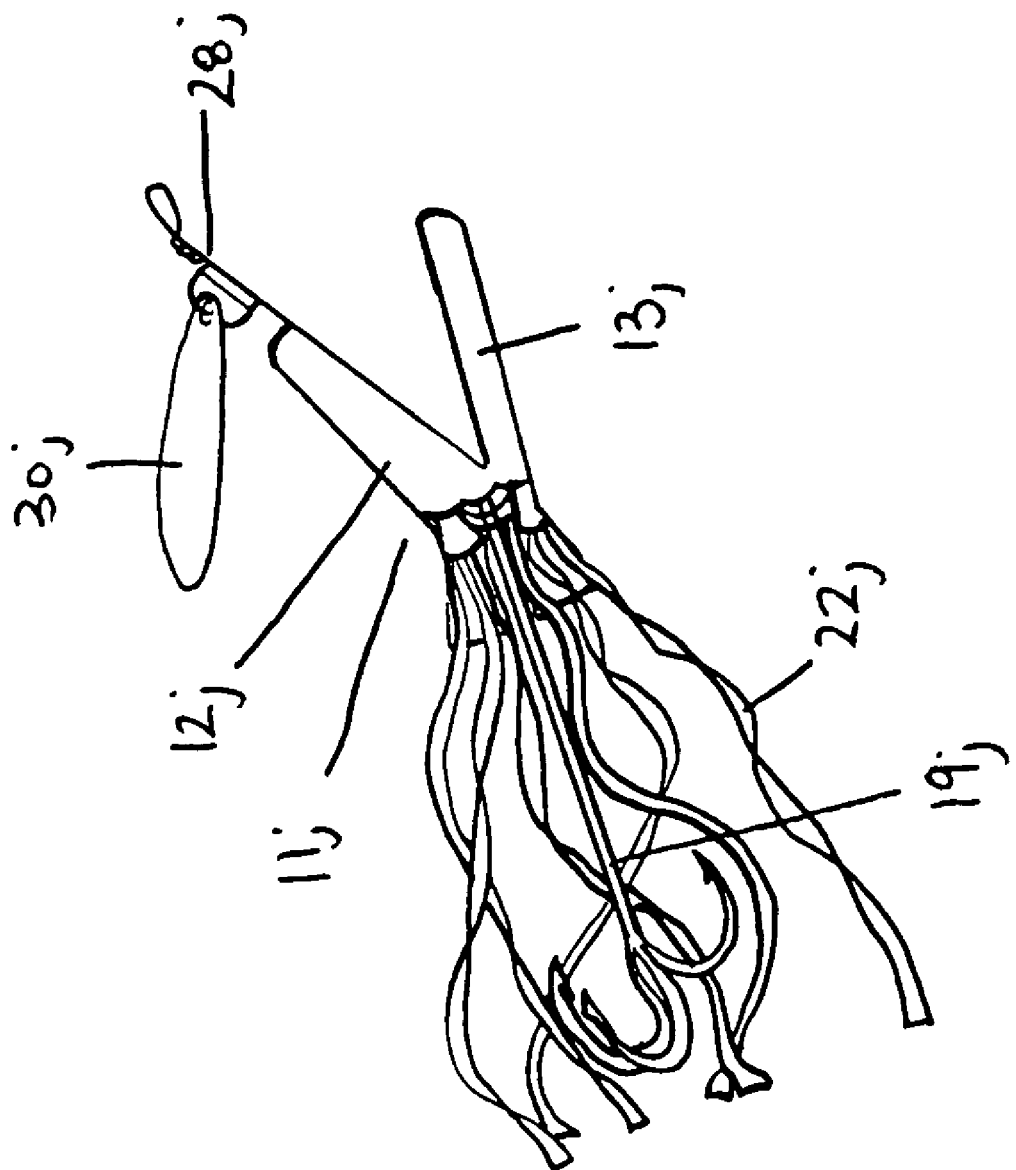
FIG. 18 is a partial perspective view of the fishing lure of FIG. 17 with the clamp in the open position.

An eleventh alternate embodiment, illustrated in FIGS. 17 and 18, depicts a clamping skirted spinner assembly 10j that includes a dressing 22j secured to the jaws of the clamp 11j. The dressing 22j partially hides the upper jaw 12j and lower jaw 13j as well as the hook 19j.

Figure 19:
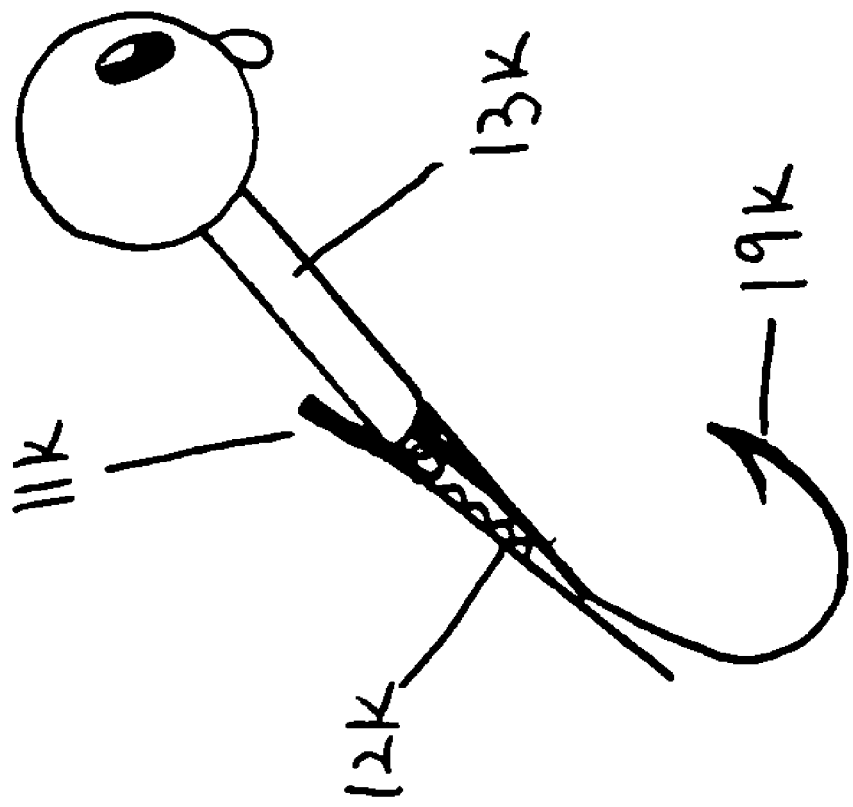
FIG. 19 is a partial perspective view of an alternate embodiment of the applicant's fishing lure illustrating a fishing jig.
Figure 20:
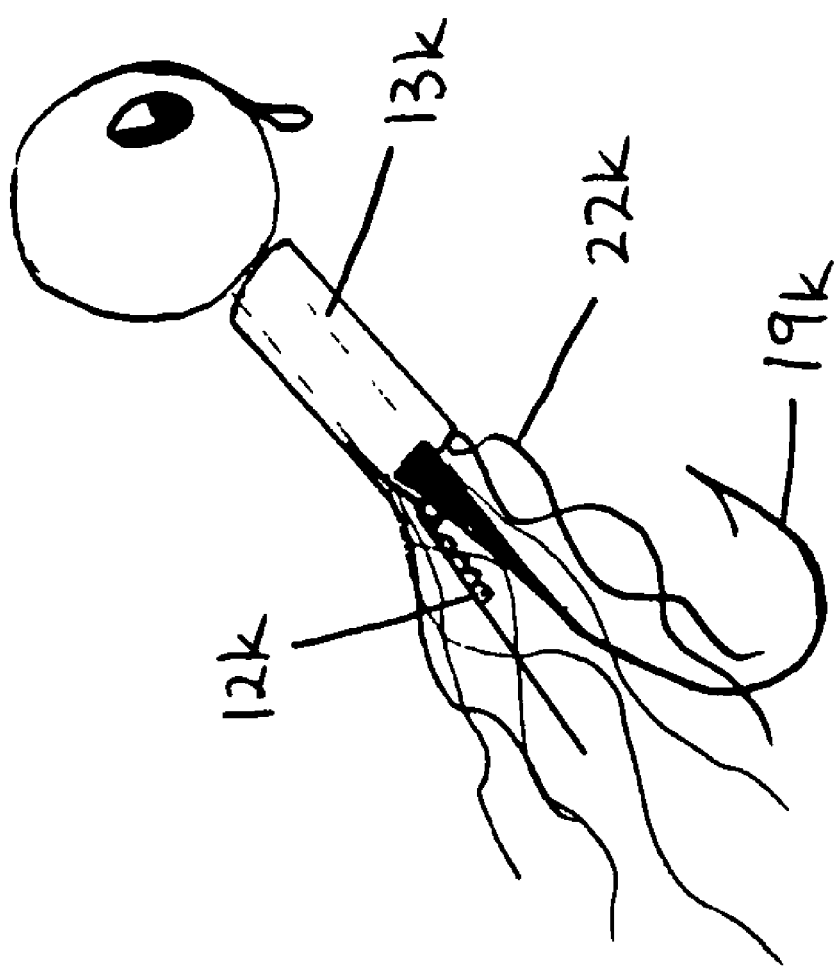
FIG. 20 is a partial perspective view of an alternate embodiment of the applicant's fishing lure illustrating a fishing jig with a dressing secured to the lure body.

A twelfth alternate embodiment is illustrated in FIGS. 19 and 20 wherein the proximal portion of the lower jaw 13k is shaped as a fishing jig. In FIG. 20, a dressing 22k is secured about a portion the lower jaw 13k. The dressing 22k partially hides the upper jaw 12k, distal portion of the lower jaw 13k, and hook 19k.

Figure 21:
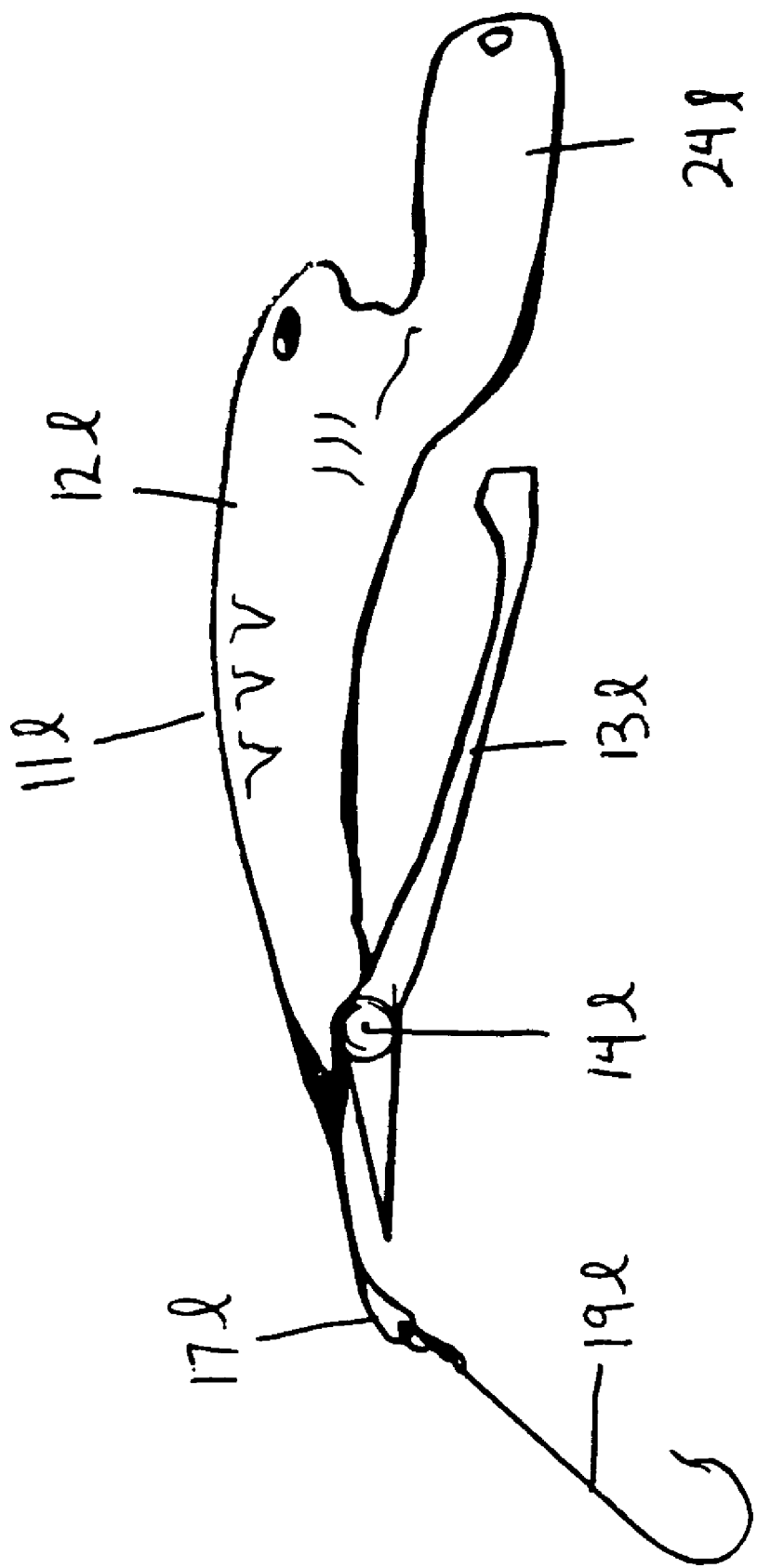
FIG. 21 is a side view of an alternate embodiment of the applicant's fishing lure illustrating a hard body lure with an extended diving lip.

A thirteenth alternate embodiment is illustrated in FIG. 21 wherein the clamp 11l is shaped as a diver with the extended diving lip 24l located at the proximal end of the upper jaw 12l. The clamp 11l is made of a rigid material and is decorated (with eyes, colors and designs) as desired.

Figure 22:
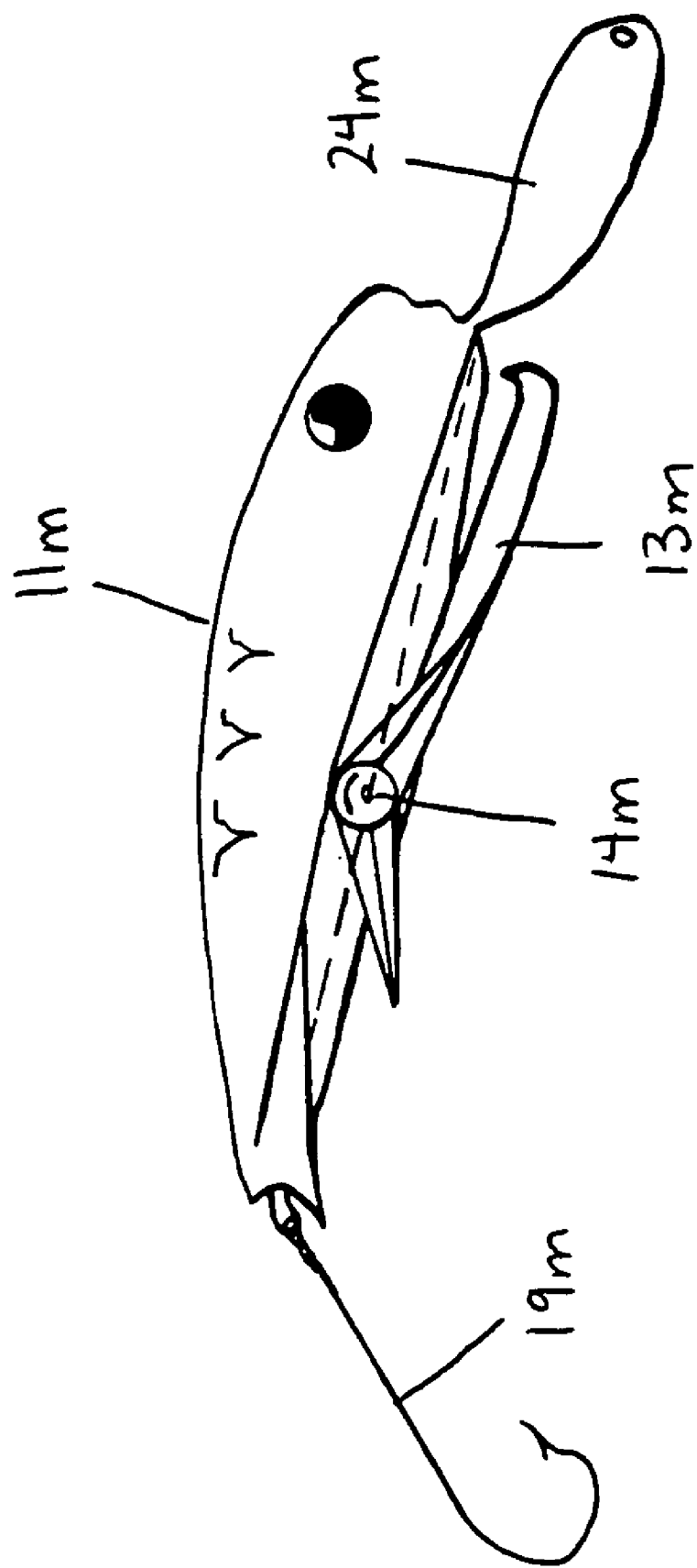
FIG. 22 is a side view of an alternate embodiment of the applicant's fishing lure illustrating a floating lure with an extended diving lip.

A fourteenth alternate embodiment is illustrated in FIG. 22 wherein the clamp 11m is once again shaped as a diver with the extended diving lip 24m located at the proximal end of the upper jaw 12m. The upper jaw 12m of this embodiment has a rigid outer shell material and has been designed to float.

Figure 23:
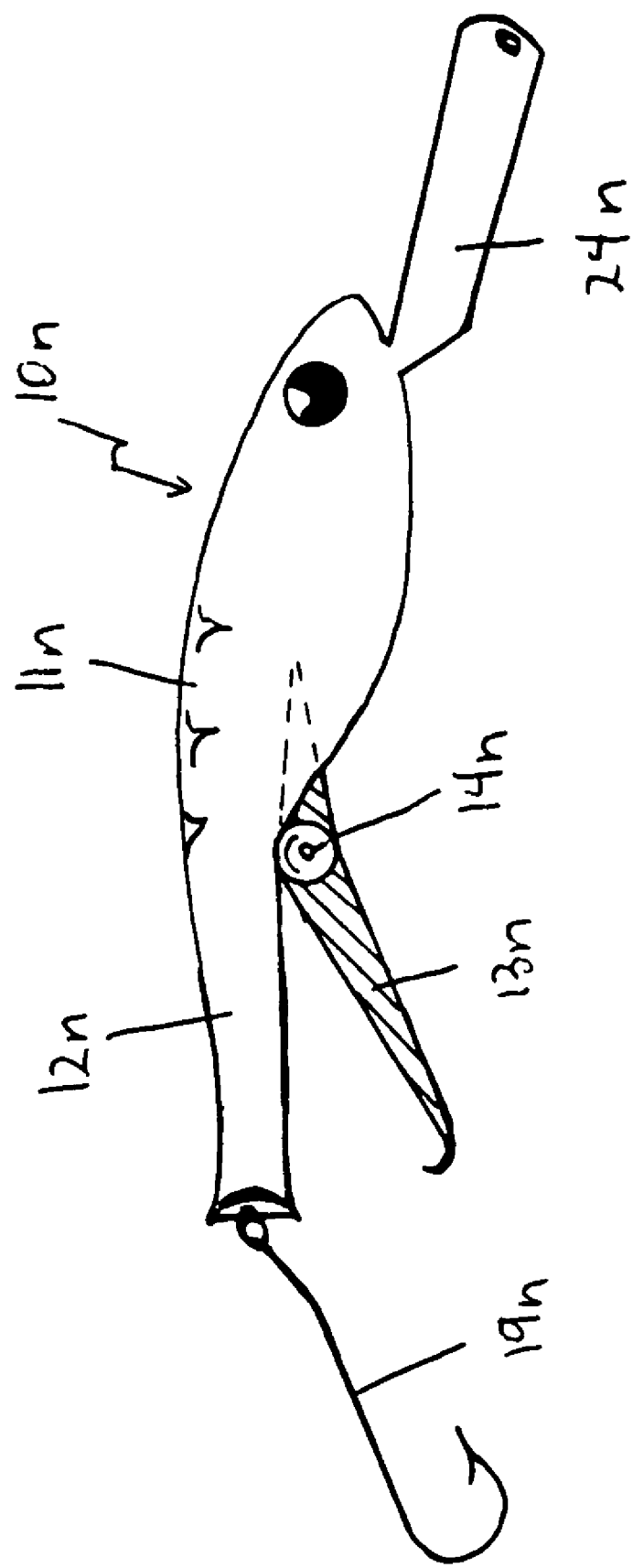
FIG. 23 is a side view of an alternate embodiment of the applicant's fishing lure illustrating a floating lure with an extended diving lip having the clamp open towards the tail.

A fifteenth alternate embodiment, illustrated in FIG. 23, depicts a floating diver lure 10n having an extended diving lip 24n extending from a proximal end of the upper jaw 12n. The upper jaw 12n and lower jaw 13n in this embodiment open toward the hook 19n (i.e., open towards the distal end rather than the proximal end).

Figure 24:
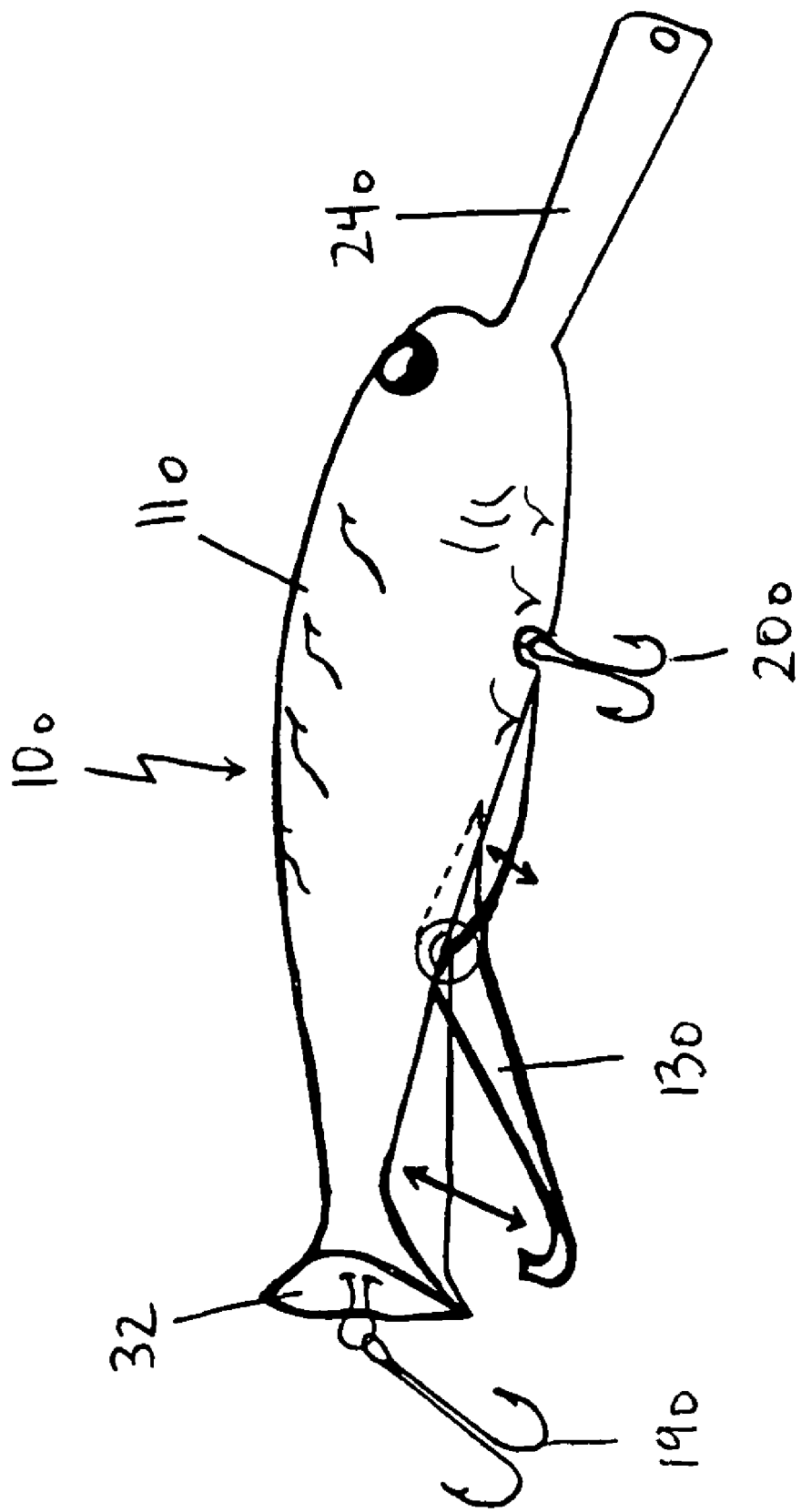
FIG. 24 is a side view of an alternate embodiment of the applicant's fishing lure illustrating a floating lure with an extended diving lip having the clamp open towards the tail and having an additional hook dangling from the underbelly of the lure body.

A sixteenth alternate embodiment, illustrated in FIG. 24, depicts a floating diving lure 10o having an extended diving lip 24o that additionally includes a hook 19o dangling from the tail 32 and a lower hook 20o located on its underbelly. The upper jaw 12o and lower jaw 13o open toward the hook 19o located on the tail 32.

Figure 25:
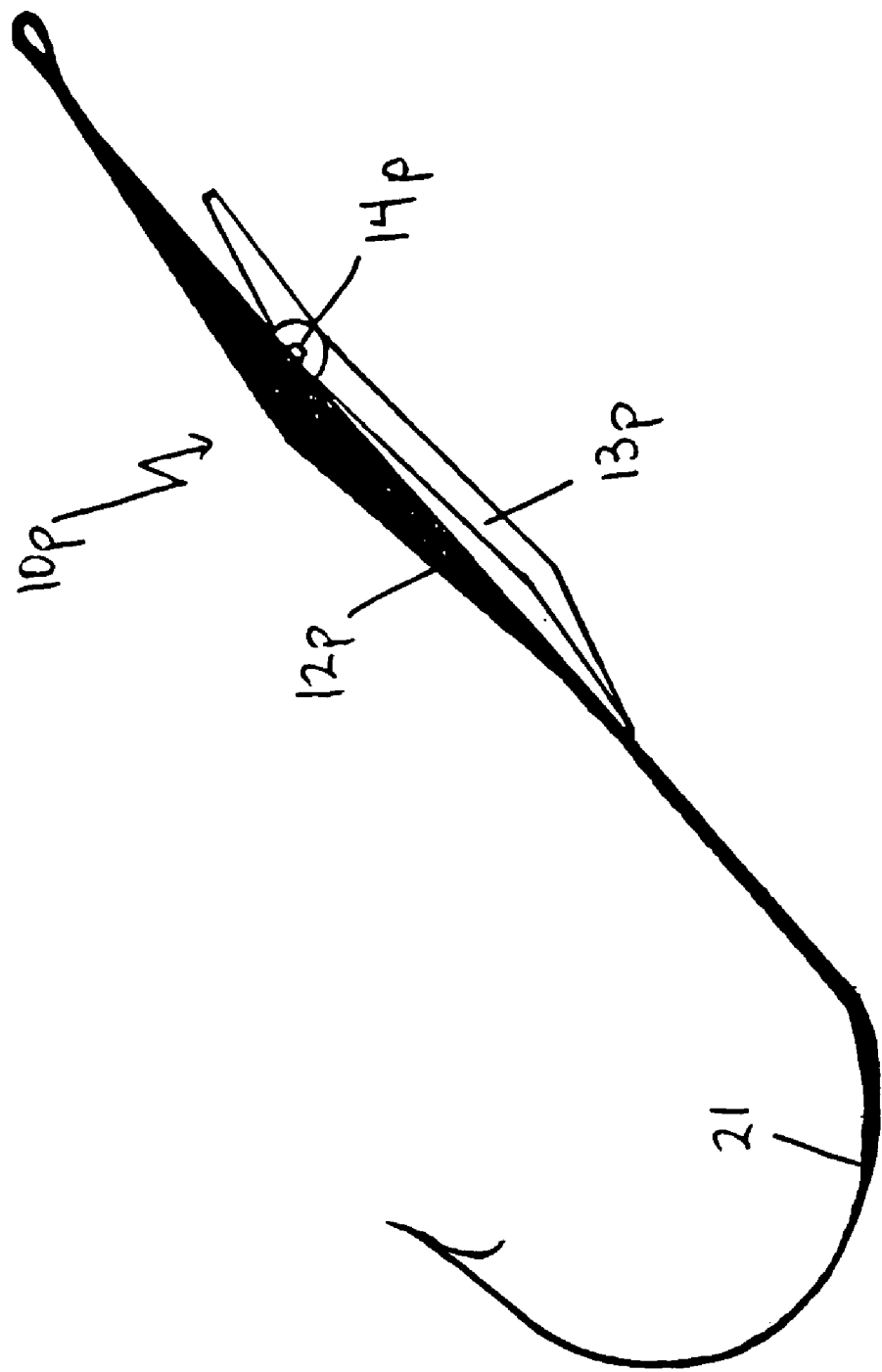
FIG. 25 is a partial perspective view of an alternate embodiment of the applicant's fishing lure illustrating a weighted hook forming the upper jaw of the clamp.
Figure 26:
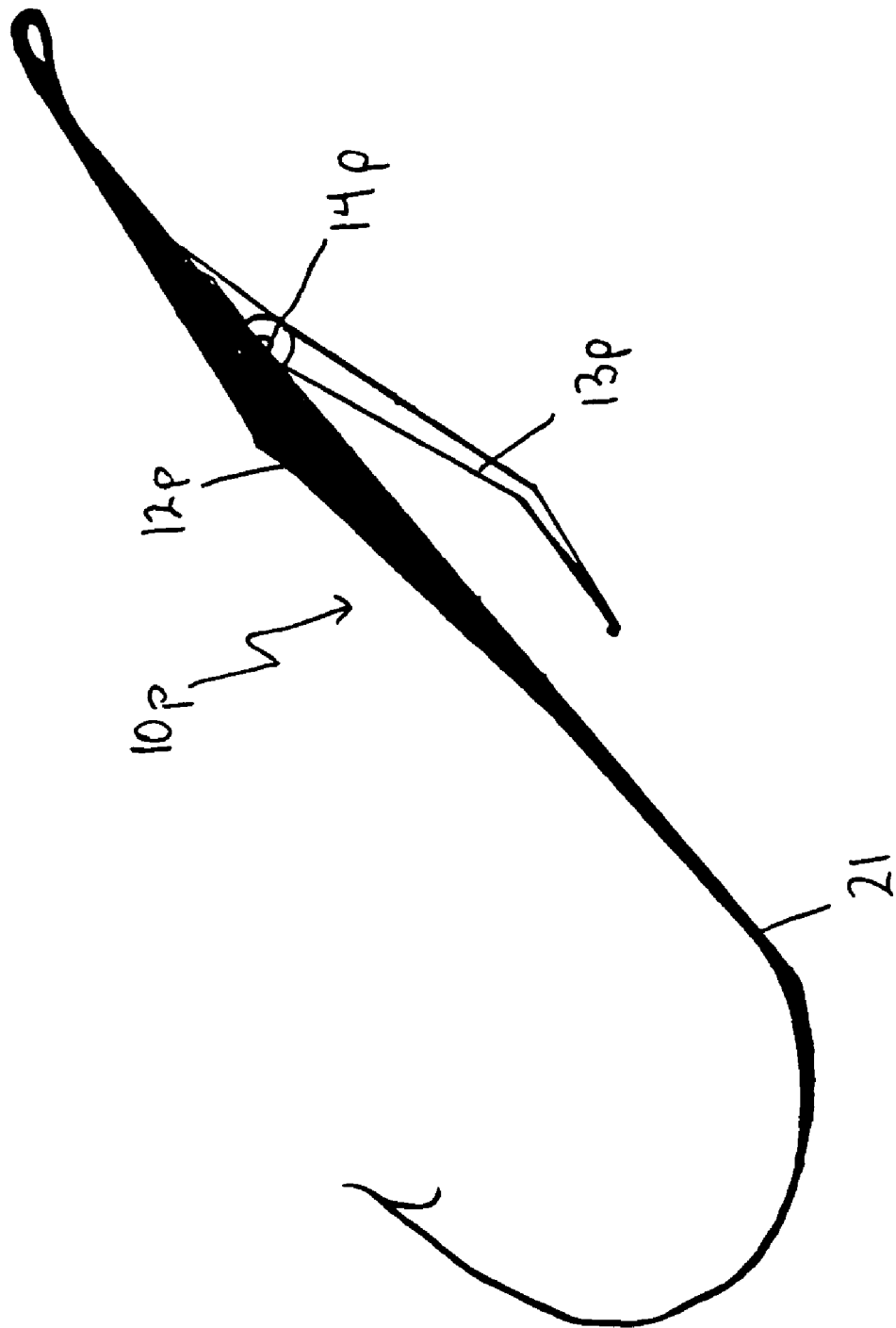
FIG. 26 is a partial perspective view of the fishing lure of FIG. 25 with the clamp in the open position.

A seventeenth alternate embodiment is illustrated in FIGS. 25 and 26 wherein the lure 10p is in the form of a weighted hook 21 formed by the upper jaw 12p of the clamp 11p, which is connected to the lower jaw 13p by the hinge 14p.

It is to be understood and will be apparent in practice that the possible structural embodiments of the present invention are numerous. In particular, all clamps illustrated in the descriptions are of an "alligator" clip nature but need not be in order to fall within the scope of the invention. The invention is a clip or clamp incorporated as part of a fishing lure, and it should therefore be obvious that other types of clips or clamps can be used.

The several embodiments of the invention illustrated and described above are only illustrations of certain preferred, basic structural embodiments in which the invention can be practiced. While these exemplary embodiments of the present invention have been described using specific terms, such description is for illustrative purposes only, and it is to be understood that variations may be made without departing from the spirit or scope of the claims. Additionally, it is to be understood that the invention is defined by the claims and it is not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A readily attachable fishing device comprising:
   a clamp, having a first jaw pivotally secured by a hinge to a second jaw opposing the first jaw, the first jaw and second jaw comprising opposing jaws biased to a closed position, the clamp having a hinge end and an opposed mouth end;
   a means for attaching a fishing line to the clamp approximate the mouth end of the clamp; and
   a fish hook connected to or integrated with a portion of the clamp approximate the hinge end of the clamp;
   wherein when said opposing jaws are compressed to an open position items may be inserted into said clamp.

2. The fishing device of claim 1, wherein at least a portion of the clamp is mounted to or integrated with a body of an artificial bait.

3. The fishing device of claim 1, further comprising an attractant coupled to the clamp, the attractant taken from a group consisting of: a skirt, a buck-tail, an artificial bait, a spinner assembly, and a rattle.

4. A method for safely transporting a fishing rod, comprising the steps of:
   providing a fishing rod and reel combination, wherein fishing line is threaded from the reel and out through a tip of the fishing rod;
   attaching a fishing lure to an end of the fishing line threaded out through the tip of the fishing rod, wherein the fishing lure includes a lure body and at least one fishing hook coupled thereto, and wherein the lure body includes a clamp;
   securing the fishing lure to the fishing rod by clamping the clamp of the lure body to the fishing rod; and
   transporting the fishing rod with the fishing lure clamped thereto.

* * * * *